United States Patent
Balmakhtar

(10) Patent No.: US 11,864,102 B2
(45) Date of Patent: *Jan. 2, 2024

(54) WIRELESS COMMUNICATION SERVICE OVER A NETWORK SLICE THAT COMPRISES A NETWORK EXPOSURE FUNCTION (NEF)

(71) Applicant: T-MOBILE INNOVATIONS LLC, Overland Park, KS (US)

(72) Inventor: Marouane Balmakhtar, Fairfax, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,584

(22) Filed: Oct. 18, 2022

(65) Prior Publication Data

US 2023/0069048 A1  Mar. 2, 2023

Related U.S. Application Data

(63) Continuation of application No. 17/355,897, filed on Jun. 23, 2021, now Pat. No. 11,528,660.

(51) Int. Cl.
| | |
|---|---|
| *H04W 8/18* | (2009.01) |
| *H04W 48/18* | (2009.01) |
| *H04W 8/08* | (2009.01) |
| *H04W 8/22* | (2009.01) |
| *H04W 36/00* | (2009.01) |

(52) U.S. Cl.
CPC ............ *H04W 48/18* (2013.01); *H04W 8/08* (2013.01); *H04W 8/18* (2013.01); *H04W 8/22* (2013.01); *H04W 36/0022* (2013.01)

(58) Field of Classification Search
CPC ..... H04W 16/18; H04W 24/02; H04W 24/10; H04W 52/367; H04W 84/18; H04W 16/20; H04W 84/12; H04W 88/08; H04B 17/318
See application file for complete search history.

(56) References Cited

U.S. PATENT DOCUMENTS 10,462,840 B2 * 10/2019 Dao ...................... H04W 76/34
10,531,420 B2     1/2020  Li et al.
(Continued)

FOREIGN PATENT DOCUMENTS

| WO | 2018232253 A1 | 12/2018 |
| WO | 2020238411 A1 | 12/2020 |
| WO | 2021048904 A1 | 3/2021 |

OTHER PUBLICATIONS

Nokia, et al.; "Discussion on LCS service in slice"; 3GPP TSG-WG SA2 Meeting #136; Nov. 2019; pp. 1-3; S2-1911829; 3GPP; Sophia Antipolis, France.

*Primary Examiner* — Julio R Perez

(57) ABSTRACT

A wireless communication network serves sensor data from a wireless sensor to a data system. The wireless communication network receives a sensor request transferred by the data system. The wireless communication network transfers the sensor request to a Network Exposure Function (NEF). The wireless communication network receives sensor data transferred by the wireless sensor. The wireless communication network transfers the sensor data to the NEF. The NEF receives the sensor data and the sensor request, and in response, transfers the sensor data for delivery to the data system.

20 Claims, 13 Drawing Sheets

(56) References Cited

U.S. PATENT DOCUMENTS

| | | | |
|---|---|---|---|
| 10,687,300 B2 | 6/2020 | Youn et al. | |
| 10,742,522 B2 | 8/2020 | Senarath et al. | |
| 10,791,508 B2* | 9/2020 | Park | H04W 48/18 |
| 10,856,265 B2* | 12/2020 | Ryu | H04W 76/25 |
| 2017/0317894 A1 | 11/2017 | Dao et al. | |
| 2018/0270778 A1 | 9/2018 | Bharatia | |
| 2020/0389843 A1 | 12/2020 | Huang et al. | |
| 2021/0282038 A1* | 9/2021 | Li | H04W 24/08 |
| 2022/0039004 A1* | 2/2022 | Soliman | H04W 88/18 |
| 2022/0053306 A1* | 2/2022 | Yang | H04W 28/16 |
| 2022/0141760 A1* | 5/2022 | Priya | H04W 48/18 |
| | | | 370/329 |
| 2022/0150740 A1* | 5/2022 | Yao | H04W 76/10 |
| 2022/0201524 A1* | 6/2022 | Ying | H04W 74/0866 |
| 2022/0225448 A1* | 7/2022 | Li | H04W 68/005 |

\* cited by examiner

WIRELESS COMMUNICATION SERVICE OVER A NETWORK SLICE THAT COMPRISES A NETWORK EXPOSURE FUNCTION (NEF)

RELATED CASES

This U.S. patent application is a continuation of U.S. patent application Ser. No. 17/355,897 that was filed on Jun. 23, 2021 and is entitled "WIRELESS COMMUNICATION SERVICE OVER A NETWORK SLICE THAT COMPRISES A NETWORK EXPOSURE FUNCTION (NEF)." U.S. patent application Ser. No. 17/355,897 is hereby incorporated by reference into this U.S. patent application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Interworking Functions (IWFs), Access and Mobility Management Functions (AMFs), Session Management Functions (SMFs), User Plane Functions (UPFs), Network Exposure Functions (NEFs), Application Functions (AFs), and the like.

The NEFs communicate with the other network elements to expose events and implement network capabilities. The NEFs and the AFs have an Application Programming Interface (API) framework to control the exposure of the events and the implementation of the network capabilities. The AFs are linked to external Application Servers (AS) that subscribe to the exposed events and services capabilities. The AS is often operated by a large operator that uses the AF and NEF to control services for a multitude of their affiliated wireless user devices. The NEF API calls from the AF allow the external AS to perform UE monitoring, device triggering, background data transfer, parameter provisioning, packet flow description management, traffic influence, chargeable party control, and NEF session quality.

The wireless user devices execute user applications that consume wireless data services. The wireless communication networks serve the wireless user devices over wireless network slices. The wireless network slices comprise slice-optimized network elements like UPFs. For example, a wireless user device that executes a user application which requires ultra-low latency would use a wireless network slice that comprises network elements which are optimized for ultra-low latency. Another wireless user device that executes a user application that requires massive video bandwidth would use a network slice that comprises network elements which are optimized for massive download speed.

Unfortunately, the wireless user devices and their wireless network slices do not effectively interact with NEFs. Moreover, the wireless user devices and the AS do not efficiently communicate over wireless network slices.

TECHNICAL OVERVIEW

A wireless communication network serves sensor data from a wireless sensor to a data system. The wireless communication network receives a sensor request transferred by the data system. The wireless communication network transfers the sensor request to a Network Exposure Function (NEF). The wireless communication network receives sensor data transferred by the wireless sensor. The wireless communication network transfers the sensor data to the NEF. The NEF receives the sensor data and the sensor request, and in response, transfers the sensor data for delivery to the data system.

DETAILED DESCRIPTION

Figure 1:
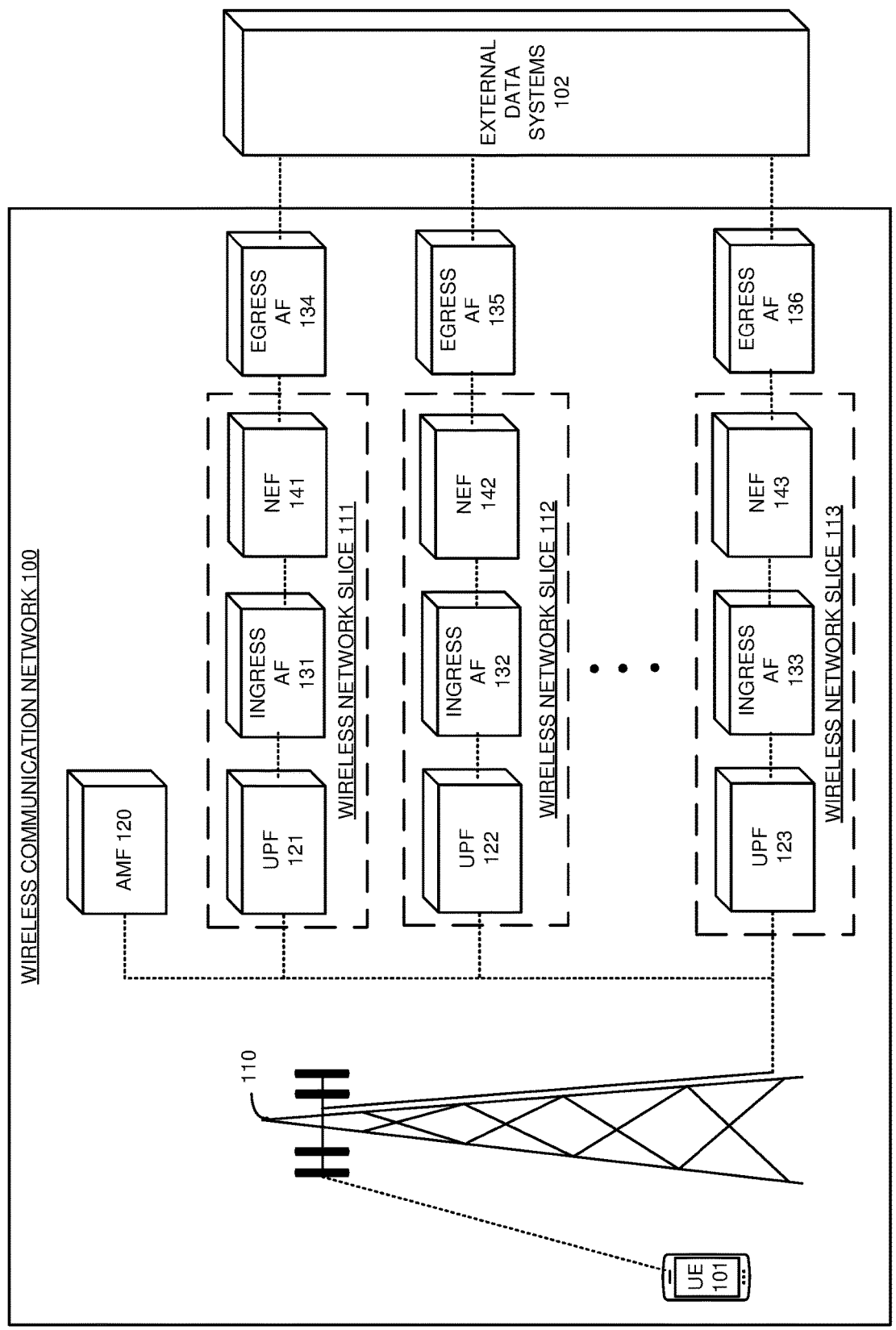
FIG. 1 illustrates a wireless communication network that serves a User Equipment (UE) over wireless network slices that comprise Network Exposure Functions (NEFs), ingress Application Functions (AFs), and User Plane Functions (UPFs).

FIG. 1 illustrates wireless communication network 100 that serves User Equipment (UE) 101 over wireless network slices 111-113 that comprise Network Exposure Functions (NEFs) 141-143, ingress Application Functions (AFs 131-133), and User Plane Functions (UPFs) 121-123. Wireless communication network 100 also comprises Radio Access Network (RAN) 110, Access and Mobility Management Function (AMF) 120, and egress AFs 134-136. Egress AFs 134-136 are linked to external data systems 102 that may comprise application servers. UE 101 comprises a computer, phone, vehicle, sensor, robot, or some other data appliance with data communication circuitry. Additional network functions like Session Management Function (SMF) and Unified Data Management (UDM) are typically present but are omitted for clarity. Wireless communication network 100 is simplified and typically includes more UEs, RANs, and slices than shown.

Various examples of network operation and configuration are described herein. In some examples, egress AF 134 transfers slice information for wireless network slice 111 to external data systems 102. For example, Network slice 111 may serve information like atmospheric sensor data from UE 101 and other UEs. Egress AF 134 receives a slice request from external data systems 102 for slice data from wireless network slice 111. Egress AF 134 transfers the slice request to NEF 141. UE 101 attaches to RAN 110 and registers with AMF 120. AMF 120 selects wireless network slice 111 for UE 101. UE 101 transfers user data over RAN 110 to UPF 121 in selected wireless network slice 111. UPF 121 transfers the user data to ingress AF 131 in wireless network slice 111. Ingress AF 131 transfers the user data to NEF 141 in wireless network slice 111—typically over a northbound Application Programming Interface (API). NEF 141 transfers the user data to egress AF 134 in response to the slice request—typically over a northbound API. Egress AF 134 transfers the user data to the requesting one of external data systems 102. UE 101 may use slices 112-113 in a similar manner, and other UEs may use slices 111-113 like UE 101.

AMF 120 selects wireless network slices for UE 101 based on a user identifier from UE 101, UE capability information from UE 101, or some other data. AMF 120 may authenticate UE 101 before selecting wireless network slices for UE 101. AMF 120 may select wireless network slices for UE 101 by exchanging UE information with a Network Slice Selection Function (NSSF) that correlates UE 101 with the appropriate ones of wireless network slices 111-113. AMF 120 may select policies for UE 101 and wireless network slices 111-113 by exchanging UE information with a Policy Control Function (PCF) that correlates UE 101 with slice policies.

Advantageously, UE 101 and wireless network slices 121-123 effectively interact with NEB 141-143. Moreover, UE 101 and external data systems 102 (like application servers) efficiently communicate over wireless network slices 111-113.

UE 101 communicates with RAN 110 over technologies like Fifth Generation New Radio (5GNR) Long Term Evolution (LTE), Institute of Electrical and Electronic Engineers (IEEE) 802.11 (WIFI), Bluetooth, or some other wireless communication protocol. The communication links in wireless communication network 100 use metallic wiring, glass fibers, radio channels, or some other communication media. The communication links use Ethernet, Time Division Multiplex (TDM), Data Over Cable System Interface Specification (DOCSIS), WIFI, Internet Protocol (IP), General Packet Radio Service Transfer Protocol (GTP), virtual switching, inter-processor communication, bus interfaces, and/or some other data communication protocols. UE 101, RAN 110, AMF 120, slices 111-113, and egress AFs 134-136 comprise microprocessors, software, memories, transceivers, bus circuitry, and the like. UE 101 and RAN 110 also comprise radios. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
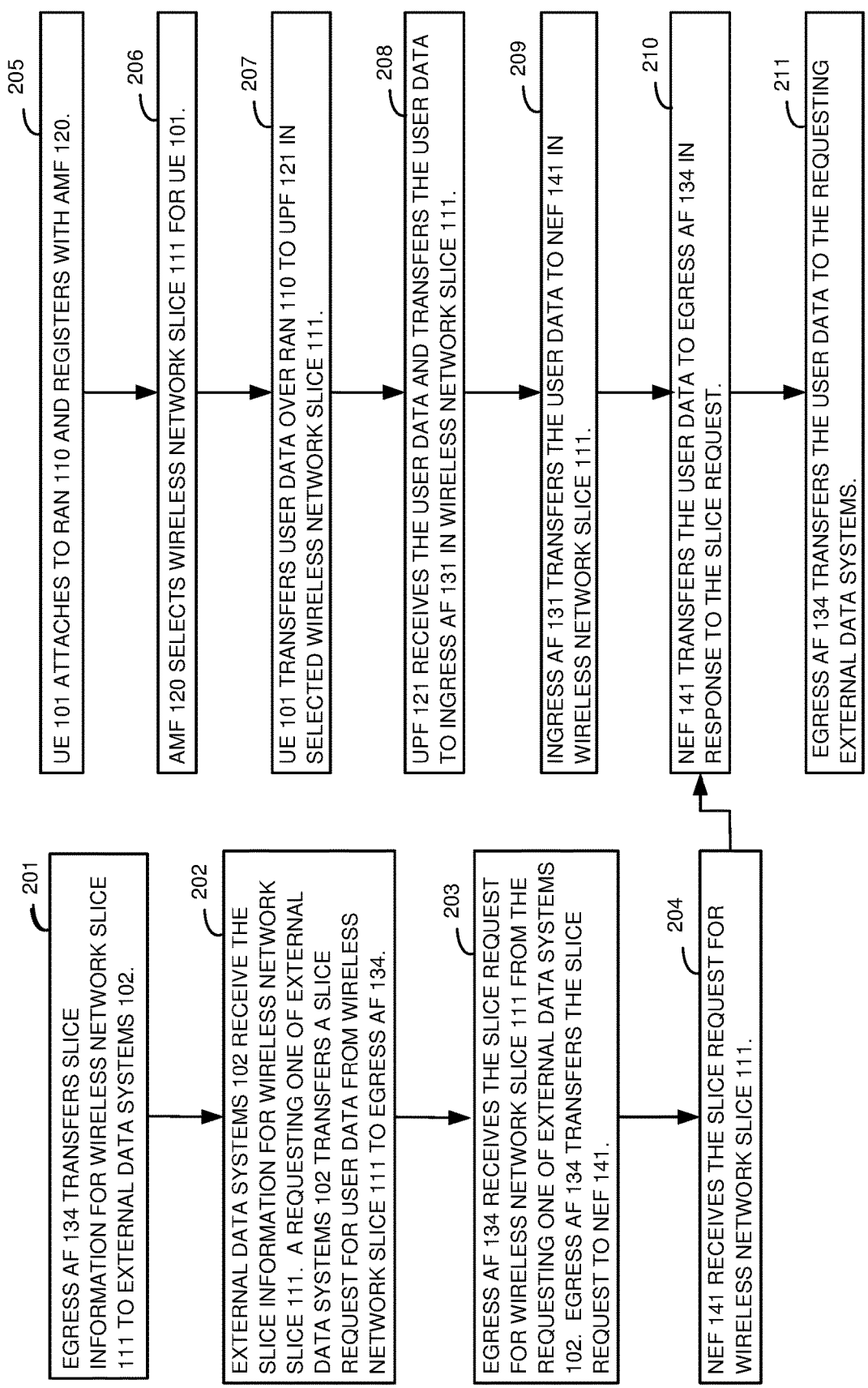
FIG. 2 illustrates an exemplary operation of the wireless communication network to serve the UE over the wireless network slices that comprises the NEFs, ingress AFs, and UPFs.

FIG. 2 illustrates an exemplary operation of wireless communication network 100 to serve UE 101 over wireless network slices 111-113 that comprises NEFs 141-143, ingress AFs 131-133, and UPFs 121-123. The operation may differ in other examples. Egress AF 134 transfers slice information for wireless network slice 111 to external data systems 102 (201). External data systems 102 receive the slice information for wireless network slice 111 and a requesting one of external data systems 102 transfers a slice request for wireless network slice 111 to egress AF 134 (202). Egress AF 134 receives the slice request for wireless network slice 111 and transfers the slice request to NEF 141 (203). NEF 141 receives the slice request (204). Contemporaneously, UE 101 attaches to RAN 110 and registers with AMF 120 (205). AMF 120 selects wireless network slice 111 for UE 101 (206). UE 101 transfers user data over RAN 110 to UPF 121 in selected wireless network slice 111 (207). UPF 121 receives the user data and transfers the user data to ingress AF 131 in wireless network slice 111 (208). Ingress AF receives the user data and transfers the user data to NEF 141 in wireless network slice 111 (209). NEF 141 receives the user data and transfers the user data to egress AF 134 in response to the slice request (210). Egress AF 134 transfers the user data to the requesting one of external data systems 102 (211).

Figure 3:
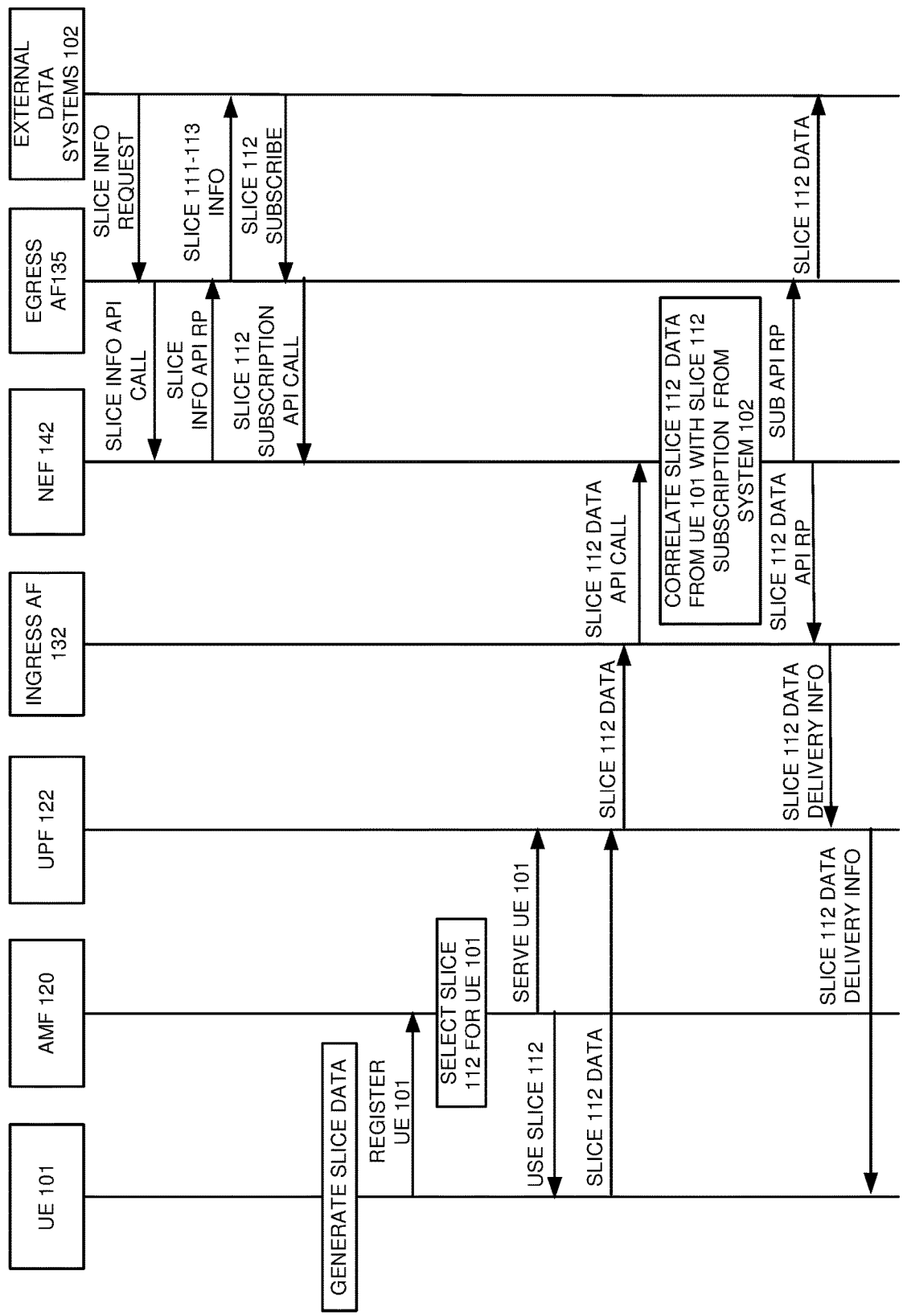
FIG. 3 illustrates an exemplary operation of the wireless communication network to serve the UE over the wireless network slices that comprises the NEFs, ingress AFs, and UPFs.

FIG. 3 illustrates an exemplary operation of wireless communication network 100 to serve UE 101 over wireless network slices 111-113 that comprises NEFs 141-143, ingress AFs 131-133, and UPFs 121-123. The operation may differ in other examples. One of external data systems 102 requests slice information from egress AF 135. Egress AF 135 transfers a slice information API call to NEF 142. NEF 142 returns slice information for wireless network slice 112 in an API response (RP) to egress AF 135. Egress AF 135 transfers the slice information to the requesting one of external data systems 102. The requesting one of external data systems 102 receives the slice information for wireless network slice 112 and transfers a subscription to egress AF 135 for user data from wireless network slice 112. Egress AF 135 receives the subscription for wireless network slice 112 and transfers a subscription API call for wireless network slice 112 to NEF 142. UE 101 generates slice data like carbon dioxide measurements, video clips, or some other information. UE 101 registers with AMF 120 over RAN 110.

AMF 120 selects wireless network slice 112 for UE 101 based on UE identity and a prior network correlation of UE 101 and slice 112. AMF 120 directs UPF 122 (through an SMF) to serve UE 101. AMF 120 directs UE 101 to use wireless network slice 112. UE 101 transfers the slice 112 data to UPF 122 in selected wireless network slice 112. UPF 122 transfers the slice 112 data to ingress AF 132 in wireless network slice 112. Ingress AF 132 transfers the slice 112 data to NEF 142 in wireless network slice 112 in a slice 112 data API call. NEF 142 transfers a subscription API response having the slice 112 data to egress AF 135 in response to the slice 112 subscription. Egress AF 135 transfers the slice 112 data to the requesting one of external data systems 102.

Figure 4:
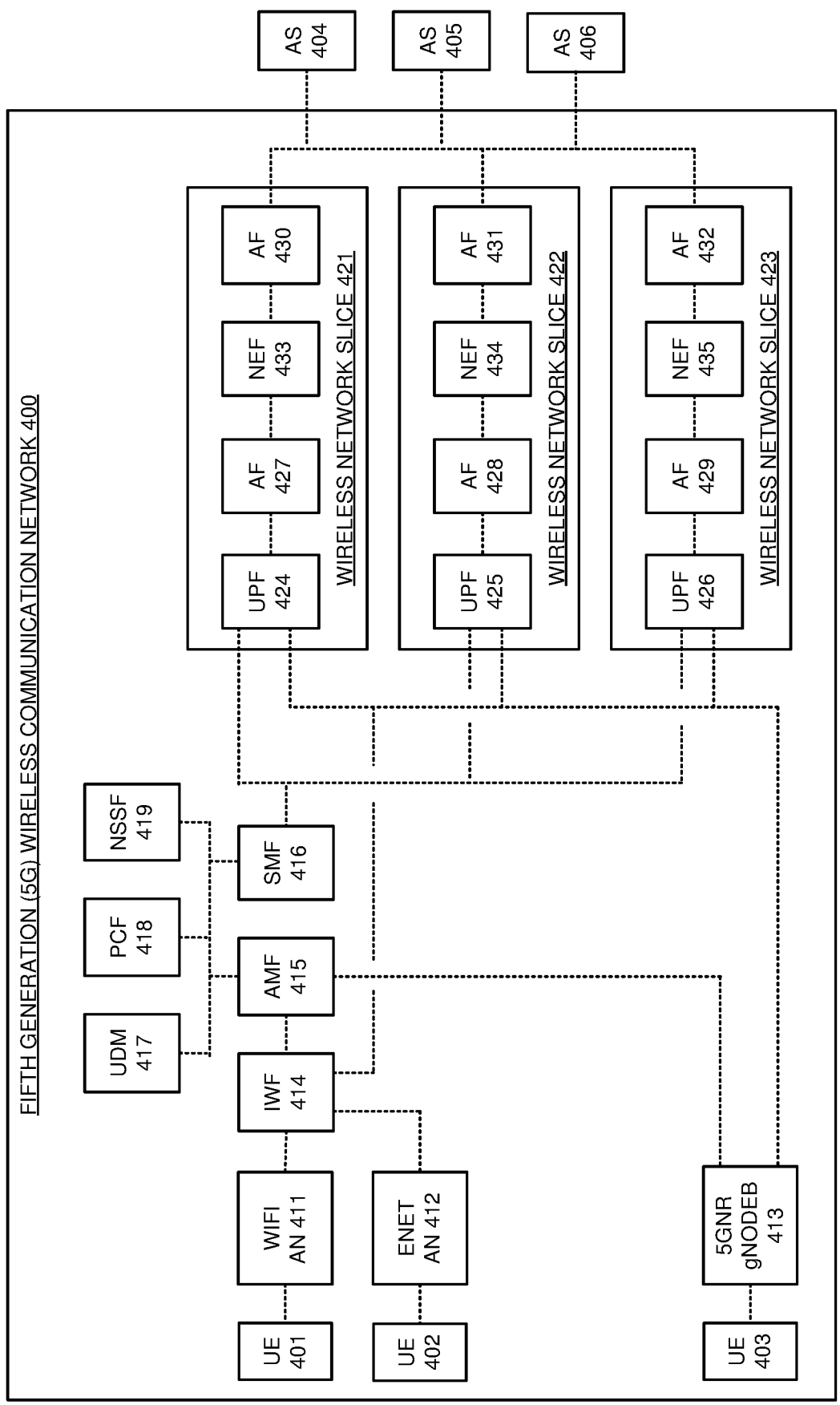
FIG. 4 illustrates a Fifth Generation (5G) wireless communication network to serve UEs over wireless network slices that comprise NEFs, AFs, and UPFs.

FIG. 4 illustrates Fifth Generation (5G) wireless communication network 400 to serve UEs 401-403 over wireless network slices 421-424 that comprise NEFs 433-435, AFs 427-429, and UPFs 424-426. 5G wireless communication network 400 comprises an example of wireless communication network 100, although network 100 may differ. 5G wireless communication network 400 comprises: UEs 401-403, WIFI Access Node (AN) 411, Ethernet (ENET) AN 412, 5GNR gNodeB 413, non-3GPP Interworking Function (IWF) 414, Access and Mobility Management Function (AMF) 415, Session Management Function (SMF) 416, Unified Data Management (UDM) 417, Policy Control Function (PCF) 418, Network Slice Selection Function (NSSF) 419, and wireless network slices 421-423. Wireless network slice 421 comprises User Plane Function (UPF) 424, Application Function (AF) 427, Network Exposure Function (NEF) 433, and AF 430. Wireless network slice 422 comprises UPF 425, AF 428, NEF 434, and AF 431. Wireless network slice 423 comprises UPF 426, AF 429, NEF 435, and AF 432.

Egress AF 430 transfers slice information to Application Server (AS) 404 that characterizes the slice data that is available from wireless network slice 421. In this example, wireless network slice 121 serves atmospheric data from UEs that have atmospheric sensors. Egress AS 404 subscribes to the atmospheric data from wireless network slice 430 by data type, location, and time in a reply to egress AF 430. Egress AF 430 transfers the atmospheric data subscription to NEF 433 in a northbound API call. UE 401 measures atmospheric conditions like temperature, carbon dioxide, sunlight, or some other metric. UE 401 attaches to WIFI AN 411 and registers with AMF 415 over IWF 414. UE 401 indicates a UE capability for wireless network slice 421. AMF 415 interacts with UDM 417 and UE 401 to verify the identity of UE 401. After authentication, AMF 415 interacts with UE 401 and NSSF 419 to select wireless network slice 421 for UE 401 based on the slice capability and a UE identifier like a Subscriber Permanent Identifier (SUPI). AMF 415 may also consider UE class, UE application, or some other UE data. After slice selection, AMF 415 interacts with PCF 418 to select network policies for UE 401 and slice 421 like data throughput and latency. AMF 415 directs UE 401 to use selected wireless network slice 421. AMF 415 directs IWF 414 and SMF 416 to serve UE 401. SMF 416 drives UPF 424 to serve UE 401. UE 401 takes sensor readings and transfers corresponding atmospheric data to UPF 424 over WIFI AN 411 and IWF 414. UPF 424 transfers the atmospheric data to ingress AF 427, and ingress AF 427 transfers the atmospheric data to NEF 433 over a northbound API. In response to the atmospheric data subscription, NEF 433 transfers the atmospheric data to egress AF 430 over the northbound API for delivery to AS 404. Egress AF 430 transfers the atmospheric data to AS 404.

Egress AF 431 transfers slice information to AS 405 that characterizes the slice data that is available from wireless network slice 422. In this example, wireless network slice 422 serves latency data from UEs that comprise augmented reality headsets. AS 405 subscribes to latency data from wireless network slice 422 for a particular augmented reality application in a reply to egress AF 431. Egress AF 431 transfers the latency data subscription for AS 405 to NEF 434 in a northbound API call. UE 402 measures data latency for the augmented reality application. UE 401 attaches to ENET AN 412 and registers with AMF 415 over IWF 414. UE 402 indicates a UE capability for wireless network slice 422. AMF 415 interacts with UDM 417 and UE 402 to verify the identity of UE 402. After authentication, AMF 415 interacts with UE 402 and NSSF 419 to select wireless network slice 422 for UE 402 based on the slice capability and a UE identifier. AMF 415 may also consider UE class, UE application, or some other UE data. After slice selection, AMF 415 interacts with PCF 418 to select network policies for UE 402 and slice 422. AMF 415 directs UE 402 to use selected wireless network slice 422. AMF 415 directs IWF 414 and SMF 416 to serve UE 402. SMF 416 drives UPF 425 to serve UE 402. UE 402 transfers latency data for the augmented reality application to UPF 425 over ENET AN 412. UPF 425 transfers the latency data to ingress AF 428, and ingress AF 428 transfers the latency data to NEF 434 over a northbound API. In response to the latency data subscription for the specific augmented reality application, NEF 434 transfers the latency data to egress AF 431 over the northbound API for delivery to AS 405. Egress AF 431 transfers the latency data to AS 405.

Egress AF 432 transfers slice information to AS 406 that characterizes the slice data that is available from wireless network slice 423. In this example, wireless network slice 423 serves vehicle data from UEs that comprise autonomous vehicles. AS 406 subscribes to vehicle data by vehicle ID in a reply to egress AF 432. Egress AF 432 transfers the vehicle data subscription for AS 406 to NEF 435 in a northbound API call. UE 403 detects vehicle status like payload, velocity, and location. UE 403 attaches to 5GNR gNodeB 413 and registers with AMF 415. UE 403 indicates a UE capability for wireless network slice 423. AMF 415 interacts with UDM 417 and UE 403 to verify the identity of UE 403. After authentication, AMF 415 interacts with UE 403 and NSSF 419 to select wireless network slice 423 for UE 403 based on the slice capability and a UE identifier. AMF 415 may also consider UE class, UE application, or some other UE data. After slice selection, AMF 415 interacts with PCF 418 to select network policies for UE 403 and slice 423. AMF 415 directs UE 403 to use selected wireless network slice 423. AMF 415 directs 5GNR gNodeB 413 and SMF 416 to serve UE 403. SMF 415 drives UPF 432 to serve UE 403. UE 403 transfers vehicle information for the autonomous vehicles to UPF 426 over 5GNR gNodeB 413. UPF 426 transfers the vehicle information to ingress AF 429, and ingress AF 429 transfers the vehicle information to NEF 435 over a northbound API. In response to the vehicle data subscription, NEF 433 transfers the vehicle data to egress AF 432 over the northbound API for delivery to AS 406. Egress AF 432 transfers the vehicle data to AS 406.

Advantageously, UEs 401-403 effectively interact with NEFs 433-434. Moreover, wireless communication network 400 efficiently uses secure network links, authenticated UEs, and network slice selection to support the interaction between the UEs 401-403, NEFs 433-435, and AS 404-405. In some examples, the operations of AS 404-406 could be performed by UEs like UEs 401-403. For example, UE 403 could subscribe to the atmospheric data from UE 101 over AF 430, and NEF 433 would transfer the atmospheric data from UE 401 to UE 403.

Figure 5:
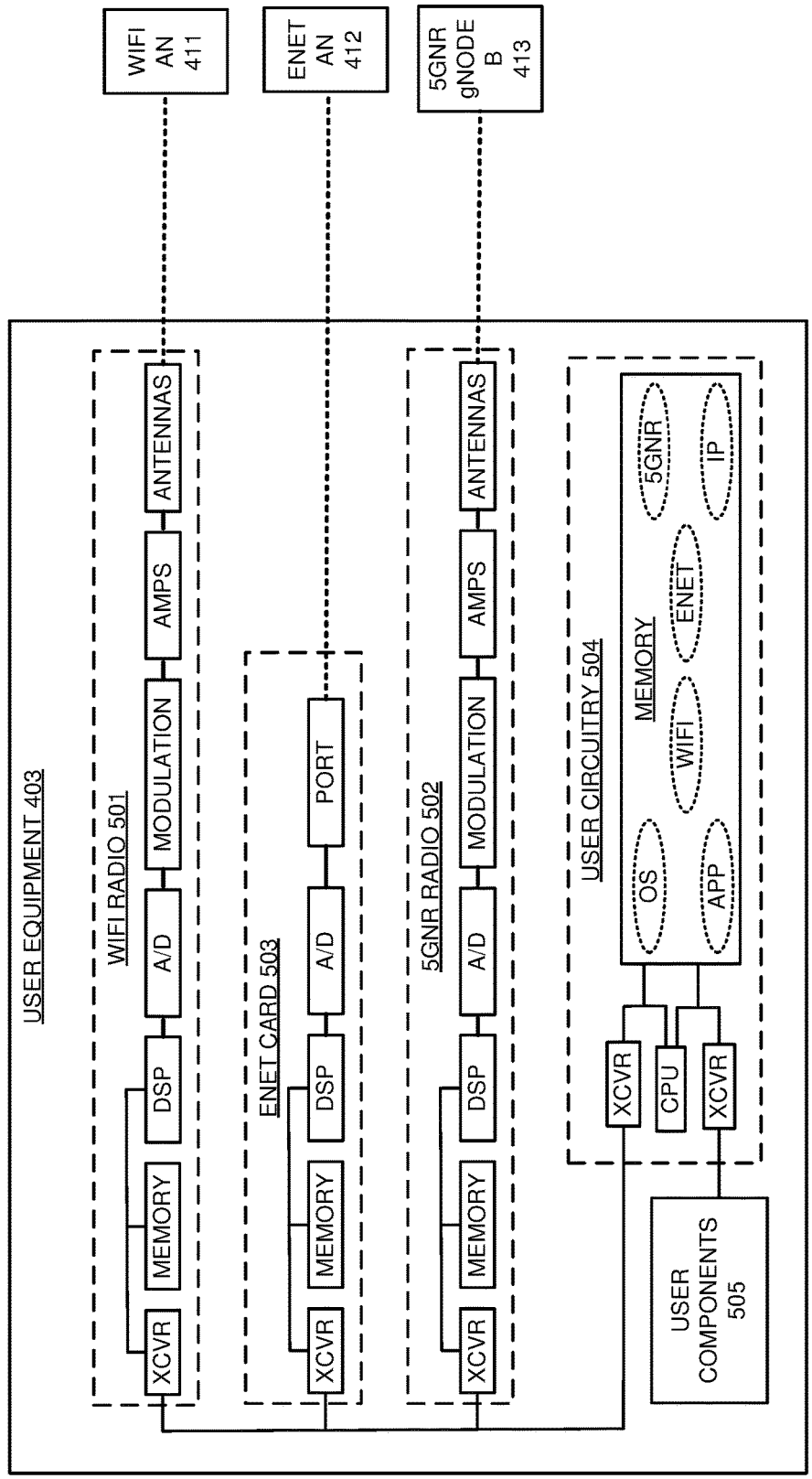
FIG. 5 illustrates a UE in the 5G wireless communication network.

FIG. 5 illustrates UE 403 in 5G wireless communication network 400. UE 403 comprises an example of UE 101, although UE 101 may differ. UE 403 comprises WIFI radio 501, 5GNR radio 502, Ethernet (ENET) card 503, user circuitry 504, and user components 505. User components 505 comprise sensors, controllers, displays, or some other user apparatus that generates slice data. Radios 501-502 comprises antennas, amplifiers, filters, modulation, analog-to-digital interfaces, DSP, memory, and transceivers that are coupled over bus circuitry. Ethernet card 503 comprises ports, analog-to-digital interfaces, DSP, memory, and transceivers that are coupled over bus circuitry. User circuitry 504 comprises memory, CPU, user interfaces and components, and transceivers that are coupled over bus circuitry. The memory in user circuitry 504 stores an operating system, user applications (APP), and network applications for WIFI, ENET, 5GNR, and IP. The network applications comprise components like Physical Layer (PHY), Media Access Control (MAC), Radio Link Control (RLC), Packet Data Convergence Protocol (PDCP), Service Data Adaption Protocol (SDAP), and Radio Resource Control (RRC). The antennas in WIFI radio 501 are wirelessly coupled to WIFI AN 411 over a WIFI link. The antennas in 5GNR radio 502 are wirelessly coupled to 5GNR gNodeB 413 over a 5GNR link. The port in ENET card 503 is wireline coupled to ENET AN 412 over an Ethernet link. Transceivers (XCVRs) in radios 501-502 and card 503 are coupled to transceivers in user circuitry 504. Transceivers in user circuitry 504 are coupled to user components 505. The CPU in user circuitry 504 executes the operating system, user applications, and network applications to exchange network signaling and slice data with: WIFI AN 411 over WIFI radio 501, ENET AN 412 over ENET card 503, and 5GNR gNodeB 413 over 5GNR radio 502. In some examples, some of the WIFI, ENET, and 5GNR components could be omitted. The 5GNR and ENET portions could be omitted to form a WIFI-only device. The 5GNR and WIFI portions could be omitted to form an ENET-only device. The WIFI and ENET portions could be omitted to form a 5GNR-only device. Other device combinations could be used like 5GNR/WIFI, 5GNR/ENET, and WIFI/ENET.

Figure 6:
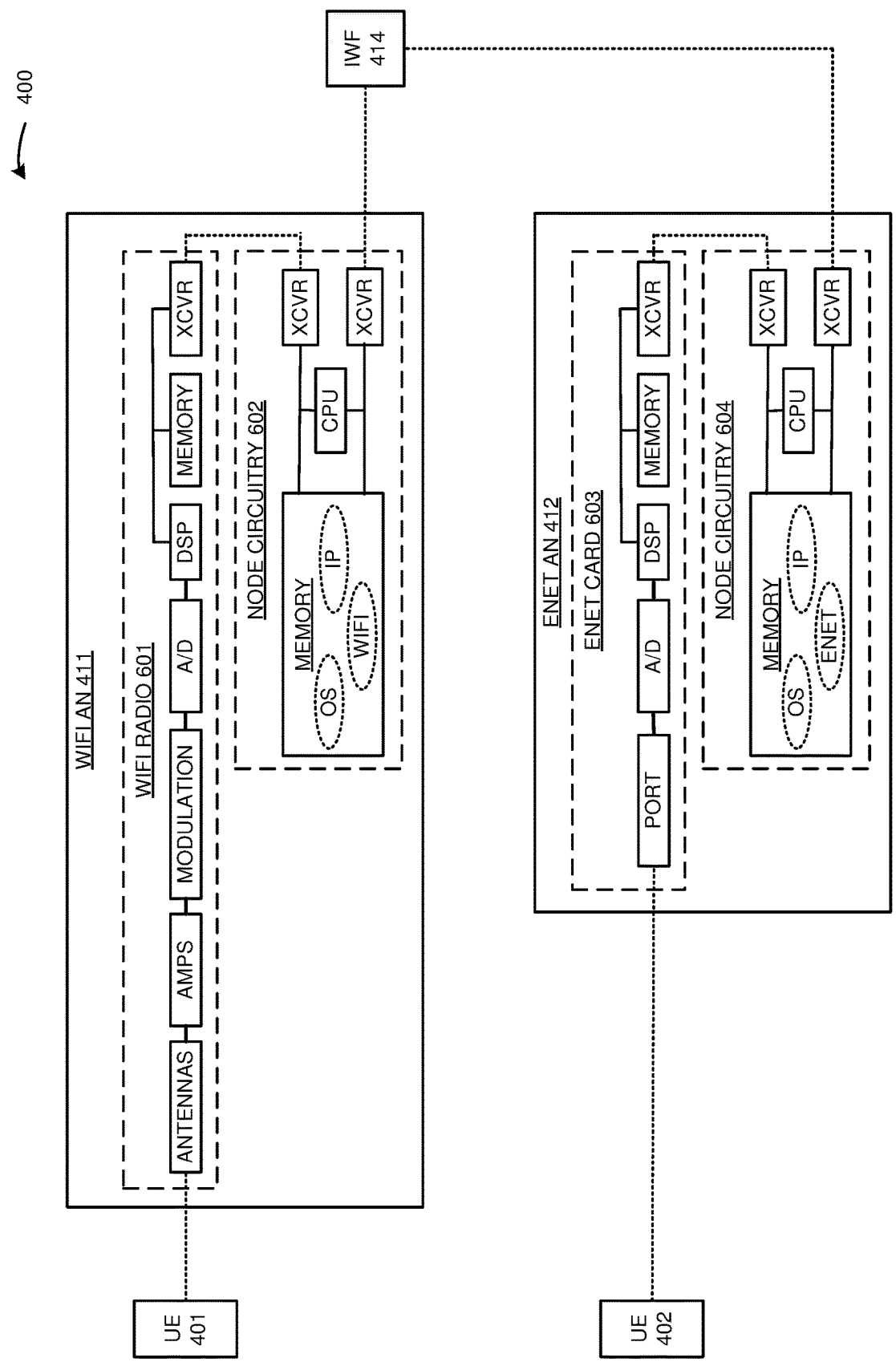
FIG. 6 illustrates non-3GPP access nodes in the 5G wireless communication network.

FIG. 6 illustrates non-3GPP ANs 411-412 in 5G wireless communication network 400. Non-3GPP access nodes 411-412 comprises an example of RAN 110, although RAN 110 may differ. WIFI AN 411 comprises WIFI radio 601 and node circuitry 602. WIFI radio 601 comprises antennas, amplifiers, filters, modulation, analog-to-digital interfaces, DSP, memory, and transceivers that are coupled over bus circuitry. Node circuitry 602 comprises memory, CPU, user interfaces and components, and transceivers that are coupled over bus circuitry. The memory in node circuitry 602 stores an operating system and network applications for IP and WIFI. The antennas in WIFI radio 601 are wirelessly coupled to UE 401 over a WIFI link. Transceivers in WIFI radio 601 are coupled to transceivers in node circuitry 602. Transceivers in node circuitry 602 are coupled to transceivers in IWF 414. The CPU in node circuitry 602 executes the operating systems and network applications to exchange network signaling and slice data with UE 401 and with IWF 414.

ENET AN 412 comprises ENET card 603 and node circuitry 604. ENET card 603 comprises ports, analog-to-digital interfaces, DSP, memory, and transceivers that are coupled over bus circuitry. Node circuitry 604 comprises memory, CPU, user interfaces and components, and transceivers that are coupled over bus circuitry. The memory in node circuitry 604 stores an operating system and network applications for IP and ENET. The ports in ENET card 603 are wireline coupled to UE 402 over an ENET link. Transceivers in ENET card 603 are coupled to transceivers in node circuitry 604. Transceivers in node circuitry 604 are coupled to transceivers in IWF 414. The CPU in node circuitry 604 executes the operating systems and network applications to exchange network signaling and slice data with UE 402 and with IWF 414.

Figure 7:
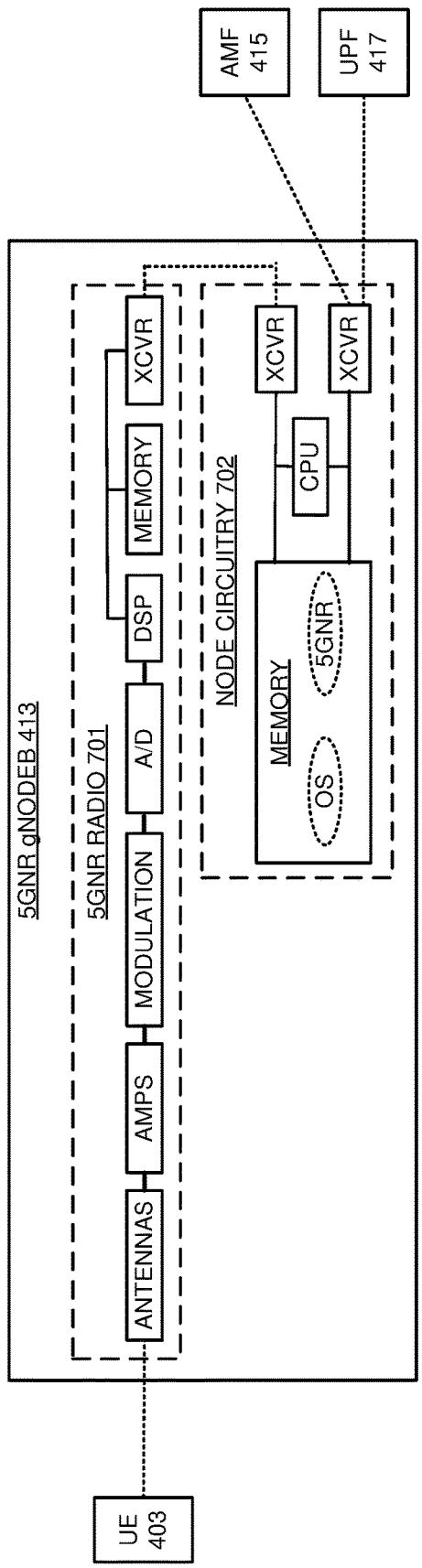
FIG. 7 illustrates a 5G New Radio (5GNR) gNodeB in the 5G wireless communication network.

FIG. 7 illustrates 5G New Radio (5GNR) gNodeB 413 in 5G wireless communication network 400. 5GNR gNodeB 413 comprises 5GNR radio 701 and node circuitry 702. 5GNR radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system and network applications for IP and 5GNR. The antennas in 5GNR radio 701 are wirelessly coupled to UE 403 over a 5GNR link. Transceivers in 5GNR radio 701 are coupled to transceivers in node circuitry 702. Transceivers in node circuitry 702 are coupled to transceivers in AMF 415 and UPF 417. The CPU in node circuitry 702 executes the operating systems and network applications to exchange network signaling and slice data with UE 403, AMF 415, and UPF 417.

Figure 8:
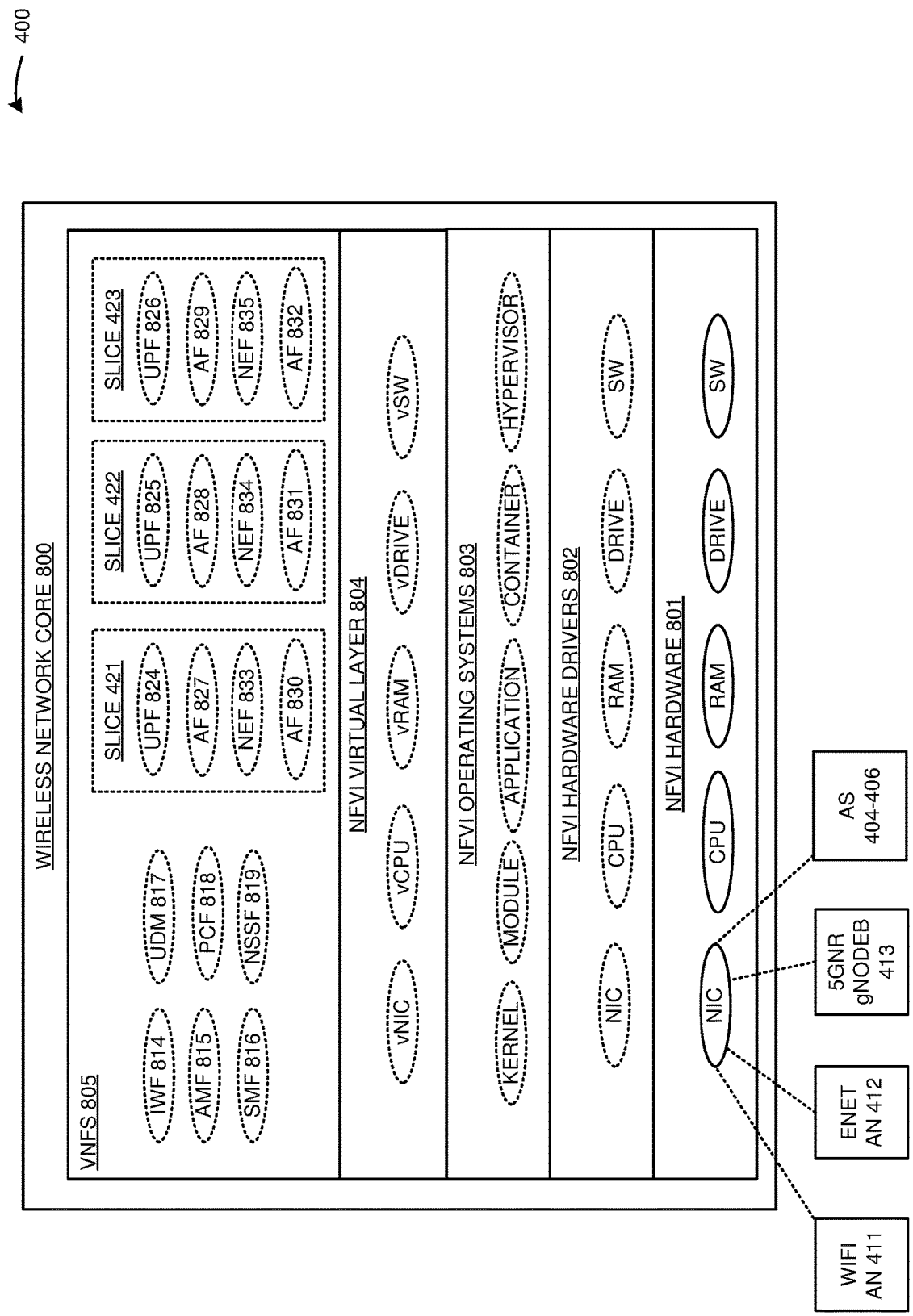
FIG. 8 illustrates a wireless network core in the 5G wireless communication network.

FIG. 8 illustrates wireless network core 800 in 5G wireless communication network 400. Wireless network core 800 comprises an example of wireless communication network 100, although network 100 may differ. Wireless network core 800 comprises Network Function Virtualization Infrastructure (NFVI) hardware 801, NFVI hardware drivers 802, NFVI operating systems 803, NFVI virtual layer 804, and Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. VNFs 805 comprise IWF VNF 814, AMF VNF 815, SMF VNF 816, UPF VNF 817, NEF VNF 818, AF VNF 819, and VNFs 825-832 for slices 421-423. Slice 421 comprises UPF VNF 824, ingress AF VNF 427, NEF VNF 833, and egress AF VNF 830. Slice 422 comprises UPF VNF 825, ingress AF VNF 428, NEF VNF 834, and egress AF VNF 831. Slice 423 comprises UPF VNF 826, ingress AF VNF 429, NEF VNF 835, and egress AF VNF 832. Other VNFs like Authentication Server Function (AUSF) and Network Repository Function (NRF) are typically present but are omitted for clarity. Wireless network core 800 may be located at a single site or be distributed across multiple geographic locations. The NIC transceivers in NFVI hardware 801 are coupled to WIFI AN 411, ENET AN 412, 5GNR gNodeB 413, and AS 404-406. NFVI hardware 801 executes NFVI hardware drivers 802, NFVI operating systems 803, NFVI virtual layer 804, and VNFs 805 to form and operate IWF 414, AMF 415, SMF 416, UPF 417, NEF 418, AF 419, and slices 421-423. The ingress and egress AFs for a given slice may comprise a single AF VNF with an ingress module and an egress module. For example, AF 427 and AF 430 in wireless network slice 421 could be integrated together and use and integrated VNF.

Figure 9:
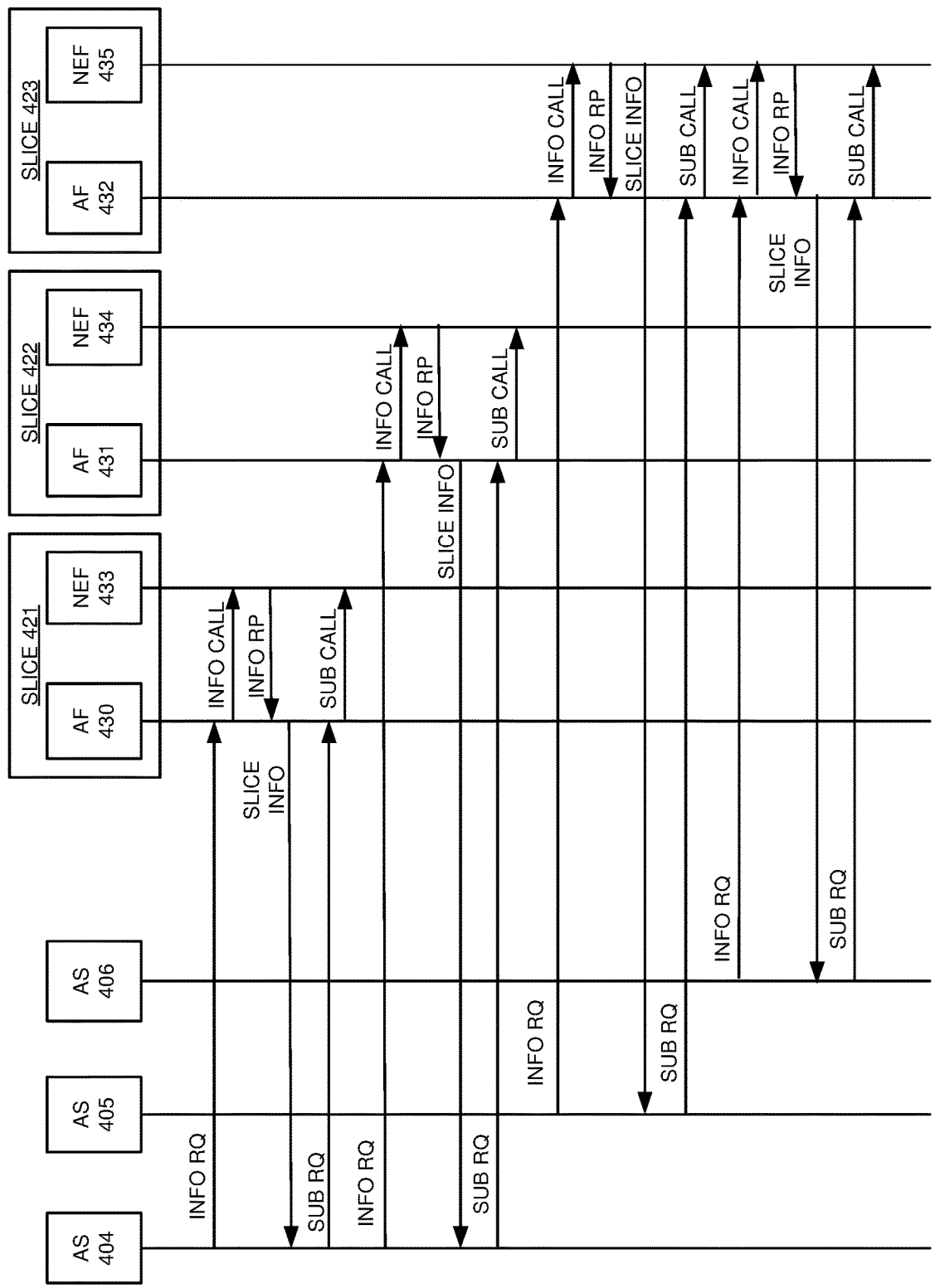
FIG. 9 illustrates an exemplary operation of the 5G wireless communication network to serve the UEs over the wireless network slices that comprise the NEFs, AFs, and UPF.

FIG. 9 illustrates an exemplary operation of 5G wireless communication network 400 to serve UEs 401-403 over wireless network slices 421-413 that comprise NEFs 433-435, AFs 427-429, and UPFs 424-426. The operation may differ in other examples. After authentication and authorization by AF 430, AS 404 transfers an information request (INFO RQ) to AF 430 for slice 421. In response to the information request, AF 430 transfers an information request API call to NEF 433. NEF 433 identifies information for slice 421 and transfers the slice information to AF 430 in a slice information API response. AF 430 transfers the slice information to AS 404. In response to the slice information, AS 404 transfers a subscription request to AF 430 for data from slice 421. AF 430 transfers a corresponding subscription (SUB) API call to NEF 433.

After authentication and authorization by AF 431, AS 404 transfers another information request to AF 431 for slice 422. In response to the information request, AF 431 transfers an information request API call to NEF 434. NEF 434 identifies information for slice 422 and transfers the slice information to AF 431 in a slice information API response. AF 431 transfers the slice information to AS 404. In response to the slice information, AS 404 transfers a subscription request to AF 431 for data from slice 422. AF 431 transfers a corresponding subscription API call to NEF 434.

After authentication and authorization by AF 432, AS 405 transfers an information request to AF 432 for slice 423. In response to the information request, AF 432 transfers an information request API call to NEF 435. NEF 435 identifies information for slice 423 and transfers the slice information to AF 432 in a slice information API response. AF 432 transfers the slice information to AS 405. In response to the slice information, AS 405 transfers a subscription request to AF 432 for data from slice 423. AF 432 transfers a corresponding subscription API call to NEF 435.

After authentication and authorization by AF 432, AS 406 transfers an information request to AF 432 for slice 423. In response to the information request, AF 432 transfers an information request API call to NEF 435. NEF 435 identifies information for slice 423 and transfers the slice information to AF 432 in a slice information API response. AF 432 transfers the slice information to AS 406. In response to the slice information, AS 406 transfers a subscription request to AF 432 for the data from slice 423. AF 432 transfers a corresponding subscription API call to NEF 435. The operation proceeds to FIG. 10.

Figure 10:
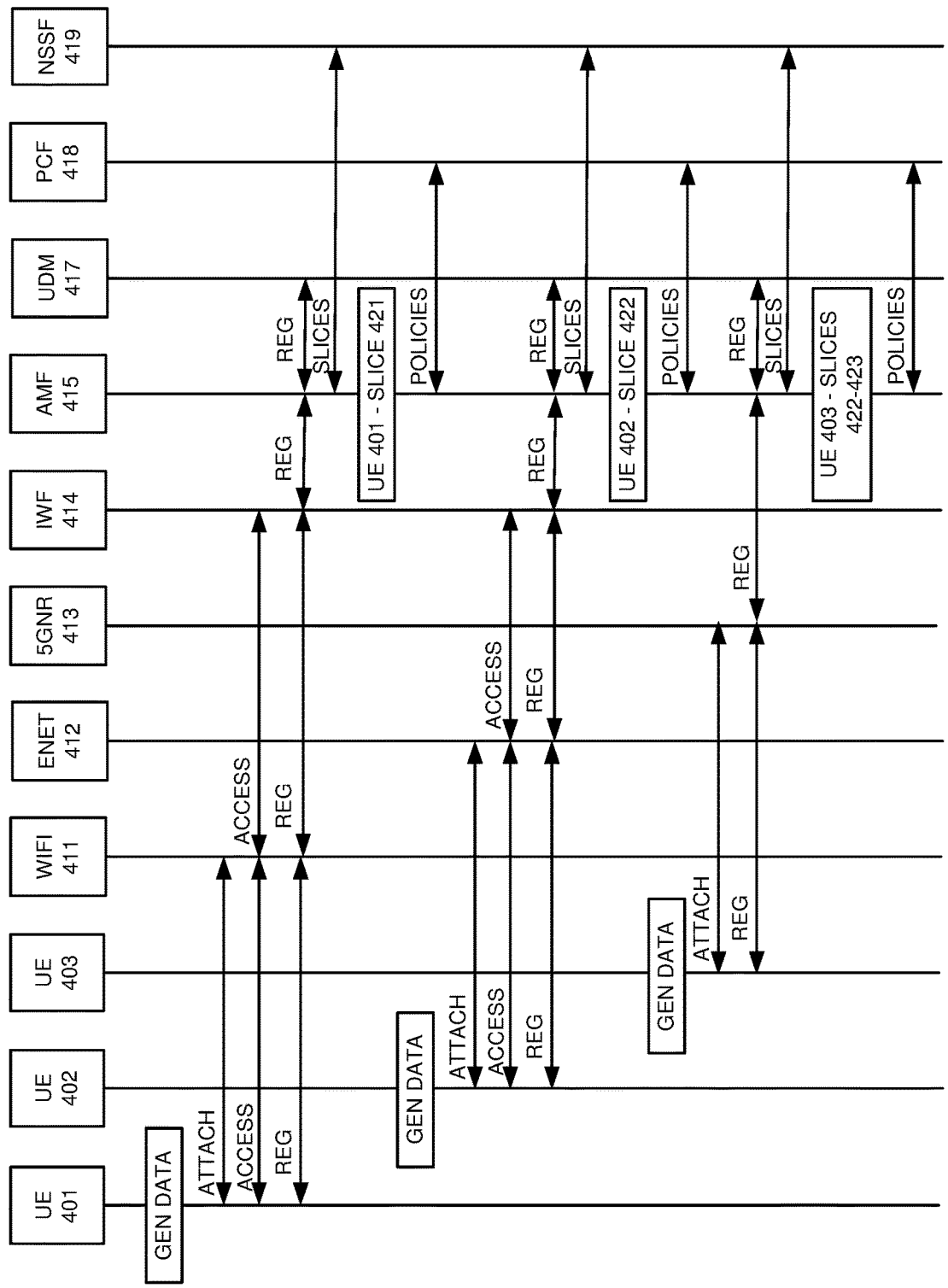
FIG. 10 illustrates an exemplary operation of the 5G wireless communication network to serve the UEs over the wireless network slices that comprise the NEFs, AFs, and UPF.

FIG. 10 illustrates the exemplary operation of the 5G wireless communication network to serve UEs 401-403 over wireless network slices 421-413 that comprise NEFs 433-435, AFs 427-429, and UPFs 424-426. The operation may differ in other examples. UE 401 generates slice data and attaches to WIFI AN 411. UE 401 interacts with IWU 414 over WIFI AN 413 to obtain access to AMF 415. UE 401 registers with AMF 415 over WIFI AN 413 and IWF 414. UE 401 indicates a UE capability for wireless network slice 421. AMF 415 interacts with UDM 417 and UE 401 to verify the identity of UE 401. After authentication, AMF 415 interacts with UE 401 and NSSF 419 to select wireless network slice 421 for UE 401 based on the UE slice capability and UE SUPI. After slice selection, AMF 415 interacts with PCF 418 to select network policies for UE 401 and slice 421 like data throughput and latency.

UE 402 generates slice data and attaches to ENET AN 412. UE 401 interacts with IWU 414 over ENET AN 412 to obtain access to AMF 415. UE 402 registers with AMF 415 over ENET AN 412 and IWF 414. UE 402 indicates a UE capability for wireless network slice 422. AMF 415 interacts with UDM 417 and UE 402 to verify the identity of UE 402. After authentication, AMF 415 interacts with UE 402 and NSSF 419 to select wireless network slice 422 for UE 402 based on the UE slice capability and UE SUPI. After slice selection, AMF 415 interacts with PCF 418 to select network policies for UE 402 and slice 422 like data throughput and latency.

UE 403 generates slice data and attaches to 5GNR gNodeB 413. UE 403 registers with AMF 415 over 5GNR gNodeB 413. UE 403 indicates a UE capability for wireless network slices 422-423. AMF 415 interacts with UDM 417 and UE 403 to verify the identity of UE 403. After authentication, AMF 415 interacts with UE 403 and NSSF 419 to select wireless network slices 422-423 for UE 403 based on the UE slice capabilities and UE SUPI. After slice selection, AMF 415 interacts with PCF 418 to select network policies for UE 403 and slices 422-423 like data throughput and latency. The operation proceeds to FIG. 11.

Figure 11:
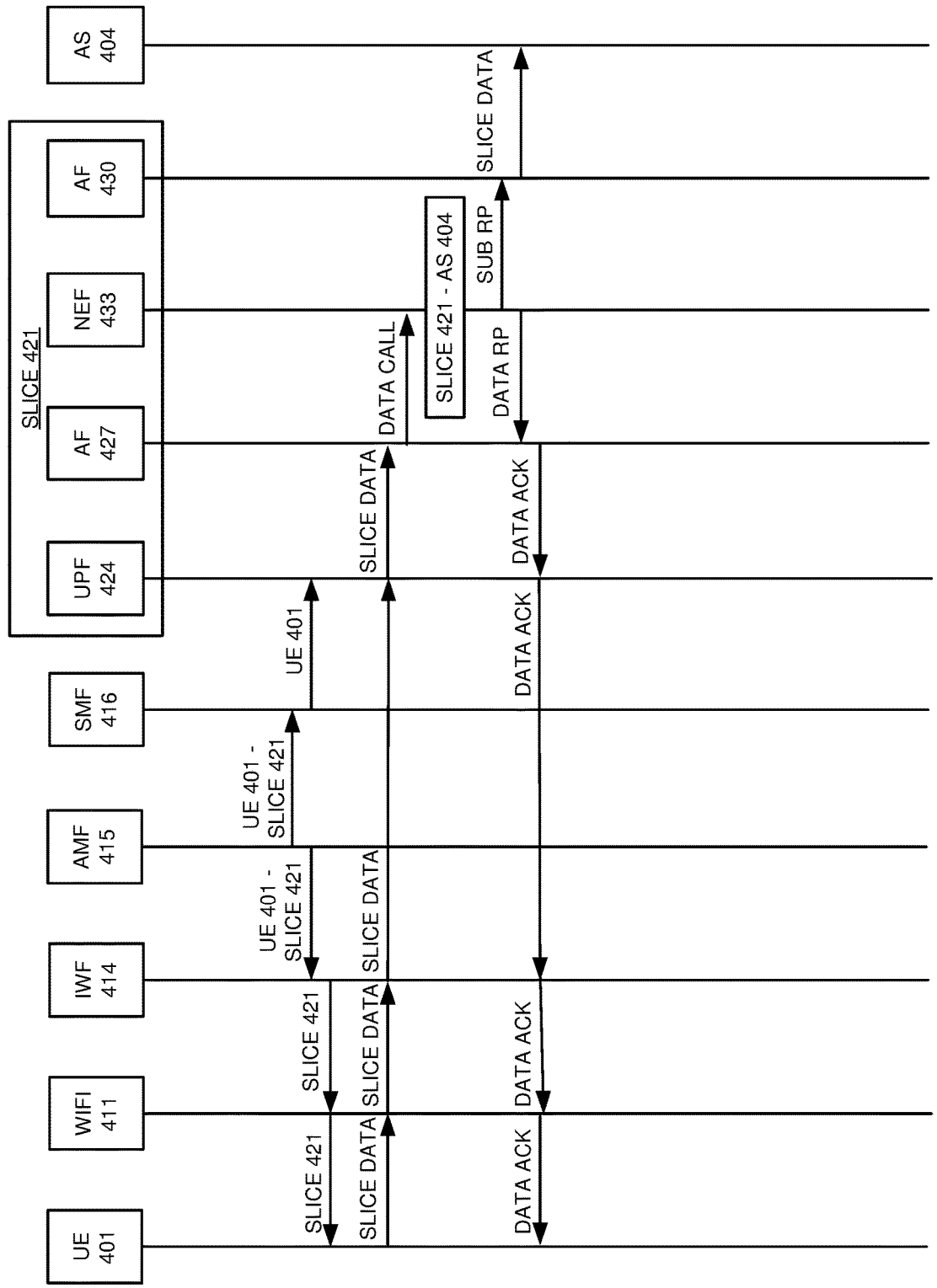
FIG. 11 illustrates an exemplary operation of the 5G wireless communication network to serve the UEs over the wireless network slices that comprise the NEFs, AFs, and UPF.

FIG. 11 illustrates an exemplary operation of 5G wireless communication network 400 to serve UEs 401-403 over wireless network slices 421-423 that comprise NEFs 433-435, AFs 427-429, and UPFs 424-426. The operation may differ in other examples. AMF 415 directs SMF 416 to serve UE 401 over slice 421. SMF 416 selects UPF 424 and signals UPF 424 to serve UE 401. AMF 415 directs IWF 414 to couple UE 401 and UPF 424. AMF 415 directs UE 401 to use slice 421 over WIFI AN 411 and IWF 414. UE 401 generates and transfers slice data to UPF 424 over WIFI AN 411 and IWF 414. UPF 424 transfers the slice data to ingress AF 427. Ingress AF 427 transfers the slice data to NEF 433 over an API slice data call. In response to the data subscription from AS 404 for slice 421, NEF 433 transfers the slice data to egress AF 430 in a subscription API response for delivery to AS 404. Egress AF 430 transfers the slice data to AS 404. NEF 433 transfers an API data response to AF 427 that indicates the slice data delivery to AS 404. AF 427 transfers a data acknowledgement (ACK) to UE 401 over UPF 424, IWF 414, and WIFI AN 411 that indicates the slice data delivery to AS 404. The operation proceeds to FIG. 12.

Figure 12:
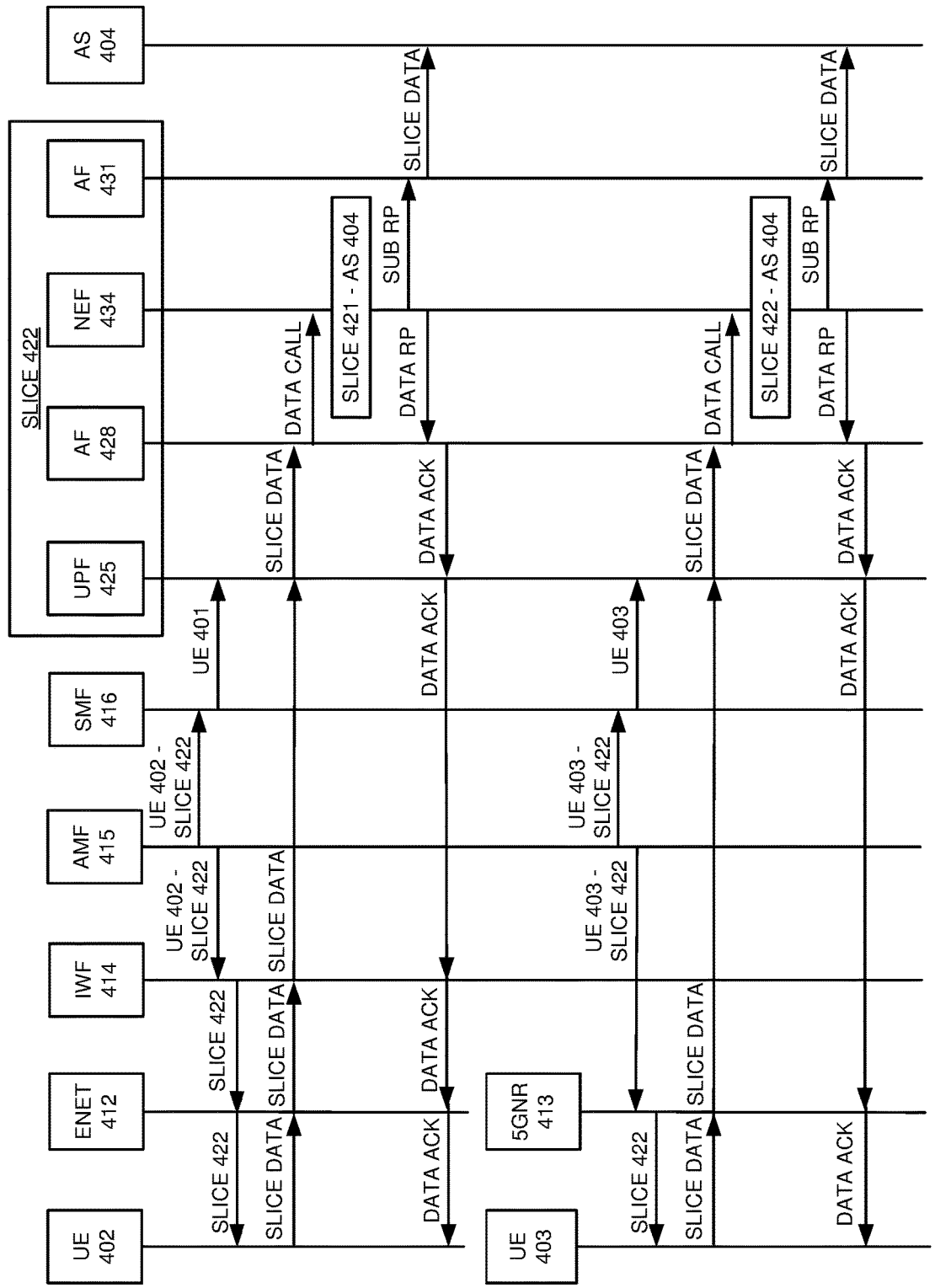
FIG. 12 illustrates an exemplary operation of the 5G wireless communication network to serve the UEs over the wireless network slices that comprise the NEFs, AFs, and UPF.

FIG. 12 illustrates an exemplary operation of the 5G wireless communication network to serve UEs 401-403 over wireless network slices 421-423 that comprise NEFs 433-435, AFs 427-429, and UPFs 424-426. The operation may differ in other examples. AMF 415 directs SMF 416 to serve UE 402 over slice 422. SMF 416 selects UPF 425 and signals UPF 425 to serve UE 402. AMF 415 directs IWF 414 to couple UE 402 and UPF 425. AMF 415 directs UE 402 to use slice 422 over ENET AN 412 and IWF 414. UE 402 generates and transfers slice data to UPF 425 over ENET AN 412 and IWF 414. UPF 425 transfers the slice data to ingress AF 428. Ingress AF 428 transfers the slice data to NEF 434 over an API slice data call. In response to the data subscription from AS 404 for slice 422, NEF 434 transfers the slice data to egress AF 431 in a subscription API response for delivery to AS 404. Egress AF 431 transfers the slice data to AS 404. NEF 434 transfers an API data response to AF 428 that indicates the slice data delivery to AS 404. AF 428 transfers a data acknowledgement to UE 402 over UPF 425, IWF 414, and ENET AN 412 that indicates the slice data delivery to AS 404.

AMF 415 directs SMF 416 to serve UE 403 over slice 422. SMF 416 selects UPF 425 and signals UPF 425 to serve UE 403. AMF 415 directs 5GNR gNodeB 413 to couple UE 403 and UPF 425. AMF 415 directs UE 403 to use slice 422 over 5GNR gNodeB 413. UE 403 generates and transfers slice data to UPF 425 over 5GNR gNodeB 413. UPF 425 transfers the slice data to ingress AF 428. Ingress AF 428 transfers the slice data to NEF 434 over an API slice data call. In response to the data subscription from AS 404 for slice 422, NEF 434 transfers the slice data to egress AF 431 in a subscription API response for delivery to AS 404. Egress AF 431 transfers the slice data to AS 404. NEF 434 transfers an API data response to AF 428 that indicates the slice data delivery to AS 404. AF 428 transfers a data acknowledgement to UE 403 over UPF 425 and 5GNR gNodeB 413 that indicates the slice data delivery to AS 404. The operation proceeds to FIG. 13.

Figure 13:
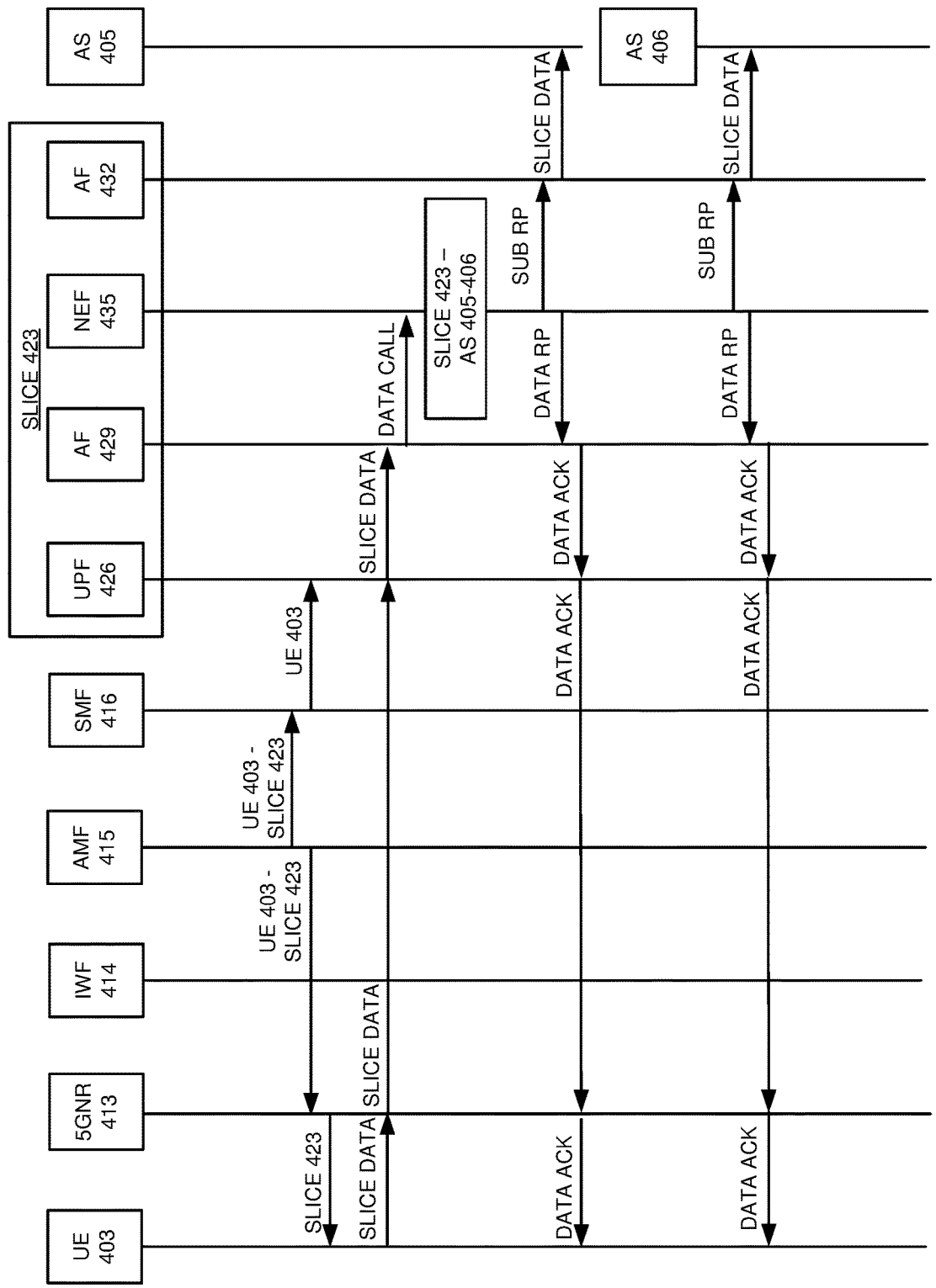
FIG. 13 illustrates an exemplary operation of the 5G wireless communication network to serve the UEs over the wireless network slices that comprise the NEFs, AFs, and UPF.

FIG. 13 illustrates an exemplary operation of the 5G wireless communication network 400 to serve UEs 401-403 over the wireless network slices 421-423 that comprise NEFs 433-435, AFs 427-429, and UPFs 424-426. The operation may differ in other examples. AMF 415 directs SMF 416 to serve UE 403 over slice 423. SMF 416 selects UPF 426 and signals UPF 426 to serve UE 403. AMF 415 directs 5GNR gNodeB 413 to couple UE 403 and UPF 426. AMF 415 directs UE 403 to use slice 423 over 5GNR gNodeB 413. UE 403 generates and transfers slice data to UPF 426 over 5GNR gNodeB 413. UPF 426 transfers the slice data to ingress AF 429. Ingress AF 429 transfers the slice data to NEF 435 over an API slice data call. In response to the data subscription from AS 405 for slice 423, NEF 435 transfers the slice data to egress AF 432 in a subscription API response for delivery to AS 405. Egress AF 432 transfers the slice data to AS 405. NEF 435 transfers an API data response to AF 429 that indicates the slice data delivery to AS 405. AF 429 transfers a data acknowledgement to UE 403 over UPF 426 and 5GNR gNodeB 413 that indicates the slice data delivery to AS 405.

In response to the data subscription from AS 406 for slice 423, NEF 435 also transfers the slice data to egress AF 432 in a subscription API response for delivery to AS 406. Egress AF 432 transfers the slice data to AS 406. NEF 435 transfers an API data response to AF 429 that indicates the slice data delivery to AS 406. AF 429 transfers a data acknowledgement to UE 403 over UPF 426 and 5GNR gNodeB 413 that indicates the slice data delivery to AS 406.

The wireless data network circuitry described above comprises computer hardware and software that form special-purpose networking circuitry to serve UEs over wireless network slices that comprise NEFs, AFs, and UPFs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve UEs over wireless network slices that comprise NEFs, AFs, and UPFs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a wireless sensor, the method comprising:
   a first Application Function (AF) receiving a sensor request transferred by a data system and transferring the sensor request to a Network Exposure Function (NEF);
   a second AF receiving sensor data transferred by the wireless sensor and transferring the sensor data to the NEF; and
   the NEF receiving the sensor data and the sensor request, and in response, transferring the sensor data for delivery to the data system.

2. The method of claim 1 wherein receiving the sensor request and transferring the sensor request to the NEF comprises receiving a wireless network slice request and transferring the wireless network slice request to the NEF.

3. The method of claim 1 wherein receiving the sensor data and transferring the sensor data to the NEF comprises a wireless network slice receiving the sensor data and transferring the sensor data to the NEF.

4. The method of claim 1 wherein the NEF receiving the sensor request and the sensor data, and in response, transferring the sensor data comprises a wireless network slice receiving the sensor data and the sensor request, and in response, transferring the sensor data.

5. The method of claim 1 further comprising the NEF indicating the availability of the sensor data to the data system and wherein the data system transfers the sensor request in response to the indication.

6. The method of claim 1 wherein the wireless sensor comprises an atmospheric sensor and the sensor data comprises atmospheric data.

7. The method of claim 1 wherein the wireless sensor comprises at least one of a temperature sensor, a carbon-dioxide sensor, and a sunlight sensor, and the sensor data comprises at least one of temperature data, carbon-dioxide data, and sunlight data.

8. A method of operating a wireless communication network to serve a wireless sensor, the method comprising:
   an egress Application Function (AF) receiving a sensor request transferred by a data system and transferring the sensor request to a Network Exposure Function (NEF);

an ingress AF receiving sensor data transferred by the wireless sensor and transferring the sensor data to the NEF;

the NEF receiving the sensor request from the egress AF and receiving the sensor data from the ingress AF, and in response, transferring the sensor data to the egress AF; and the egress AF receiving the sensor data from the NEF and transferring the sensor data for delivery to the data system in response to the sensor request.

9. The method of claim 8 wherein the egress AF receiving the sensor request and transferring the sensor request to the NEF comprises receiving a wireless network slice request and transferring the wireless network slice request to the NEF.

10. The method of claim 8 wherein the ingress AF receiving the sensor data and transferring the sensor data to the NEF comprises a wireless network slice receiving the sensor data and transferring the sensor data to the NEF.

11. The method of claim 8 wherein the NEF receiving the sensor request and the sensor data, and in response, transferring the sensor data to the egress AF comprises a wireless network slice receiving the sensor request and the sensor data, and in response, transferring the sensor data to the egress AF.

12. The method of claim 8 further comprising the egress AF indicating the availability of the sensor data to the data system and wherein the data system transfers the sensor request in response to the indication.

13. The method of claim 8 wherein the wireless sensor comprises an atmospheric sensor and the sensor data comprises atmospheric data.

14. The method of claim 8 wherein the wireless sensor comprises at least one of a temperature sensor, a carbon-dioxide sensor, and a sunlight sensor, and the sensor data comprises at least one of temperature data, carbon-dioxide data, and sunlight data.

15. A wireless communication network to serve a wireless sensor, the wireless communication network comprising:

an egress Application Function (AF) configured to receive a sensor request transferred by a data system and transfer the sensor request to a Network Exposure Function (NEF);

an ingress AF configured to receive sensor data transferred by the wireless sensor and transfer the sensor data to the NEF;

the NEF configured to receive the sensor request from the egress AF and receive the sensor data from the ingress AF, and in response, transfer the sensor data to the egress AF; and the egress AF configured to receive the sensor data from the NEF and transfer the sensor data for delivery to the data system in response to the sensor request.

16. The wireless communication network of claim 15 wherein the egress AF is configured to receive a wireless network slice request and transfer the wireless network slice request to the NEF to receive the sensor request and transfer the sensor request to the NEF.

17. The wireless communication network of claim 15 wherein the ingress AF comprises a wireless network slice configured to receive the sensor data and transfer the sensor data to the NEF to receive the sensor data and transfer the sensor data to the NEF.

18. The wireless communication network of claim 15 wherein the NEF comprises a wireless network slice configured to receive the sensor request and the sensor data, and in response, transfer the sensor data to the egress AF to receive the sensor request and the sensor data, and in response, transfer the sensor data to the egress AF.

19. The wireless communication network of claim 15 further comprising the egress AF configured to indicate the availability of the sensor data to the data system and wherein the data system transfers the sensor request in response to the indication.

20. The wireless communication network of claim 15 wherein the wireless sensor comprises an atmospheric sensor and the sensor data comprises atmospheric data.

* * * * *